United States Patent [19]
Tsuchida

[11] Patent Number: 5,809,968
[45] Date of Patent: Sep. 22, 1998

[54] CYLINDER HEAD AND FLOW PASSAGE THEREFOR

[75] Inventor: Naoki Tsuchida, Iwata, Japan

[73] Assignee: Yamaha Hatsudoki Kabushiki Kaisha, Iwata, Japan

[21] Appl. No.: 626,541

[22] Filed: Apr. 2, 1996

[30] Foreign Application Priority Data

Apr. 4, 1995 [JP] Japan ................................ 7-079007

[51] Int. Cl.$^6$ ........................................................ F01L 3/04
[52] U.S. Cl. .................... 123/432; 123/188.8; 123/193.5
[58] Field of Search ............................. 123/188.8, 193.5, 123/41.85, 41.82 R, 432

[56] References Cited

U.S. PATENT DOCUMENTS

| | | |
|---|---|---|
| 4,187,823 | 2/1980 | Brown, Jr. . |
| 5,119,784 | 6/1992 | Hashimoto et al. ................. 123/432 |
| 5,119,785 | 6/1992 | Saito et al. ......................... 123/432 |
| 5,138,988 | 8/1992 | Distelrath et al. ................. 123/432 |
| 5,431,136 | 7/1995 | Kenmoku et al. ................. 123/188.8 |
| 5,492,091 | 2/1996 | Russ .................................. 123/188.8 |

FOREIGN PATENT DOCUMENTS

| | | |
|---|---|---|
| 0130604 | 1/1985 | European Pat. Off. . |
| 0195177 | 9/1986 | European Pat. Off. . |
| 0228282 | 7/1987 | European Pat. Off. . |
| 0640754 | 3/1995 | European Pat. Off. . |
| 996888 | 12/1951 | France . |

OTHER PUBLICATIONS

European Search Report dated Jun. 6, 1997.

*Primary Examiner*—Erick R. Solis
*Attorney, Agent, or Firm*—Knobbe, Martens, Olson & Bear LLP

[57] ABSTRACT

A cylinder head construction for an internal combustion engine embodying a bonded valve seat so that the flow passages can extend substantially straight through the cylinder head to the valve seat and pass through the center of the valve seat and intersect the center of the respective valve.

11 Claims, 8 Drawing Sheets

CYLINDER HEAD AND FLOW PASSAGE THEREFOR

BACKGROUND OF THE INVENTION

This invention relates to a cylinder head for an internal combustion engine and more particularly to an improved flow passage therefor.

As should be readily apparent, the configuration of the flow passages of internal combustion engines is very important in obtaining the desired engine performance. Although this is true for both the intake and exhaust passages, it is particularly true with respect to the configuration of the intake passages.

In order to obtain the maximum power output for an engine, the intake passages should be configured so that they are relatively large and offer a relatively low flow restriction. By so configuring the intake passages, high volumetric efficiencies and engine power outputs can be achieved. Of course, there are some instances where the configuration of the intake passage should not be of this nature. That is, at times it is desirable to configure the intake passage so that it will appropriately direct the flow of the intake charge into the combustion chamber so as to achieve some form of turbulence in the combustion chamber. Turbulence is desirable, particularly at low speeds and low loads so as to ensure rapid flame propagation and more complete combustion.

In many instances, it is also the practice to employ multiple passages for serving both the intake and/or exhaust functions. By utilizing more intake and/or exhaust valves rather than single large valves, the engine performance can be improved. Once reason for this is that the smaller valves have lower inertia and can, thus, permit the engine to operate at higher rotational speeds than when using single, large and heavy valves.

In many engine applications, however, the configuration of the flow passages and particularly those formed in the cylinder head are dictated by something other than the optimum or desired flow patterns. That is, the configuration may be dictated at least in substantial part by the way in which the cylinder head, its flow passage and the valve seat is formed.

With many types of engine constructions and, particularly those using light alloys cylinder heads such as aluminum or aluminum alloys, there is provided a valve seat insert ring at the cylinder head side of the flow passage. This insert ring forms the actual valve seat with which the poppet valve for controlling the flow cooperates. The reason for using these insert rings is to provide a better seating surface and one having longer life than would be possible if the base material of the cylinder head were utilized as the valve seat.

One conventional way in which the valve seat has been formed is by using an insert ring that is press fit into place in the cylinder head. The use of press in valve seat inserts has a number of disadvantages. Not the least of these is that the insert ring must be fairly large and robust in order to withstand the pressing in loads. As a result, the configuration of the intake and exhaust passages is frequently dictated by this insert ring.

The effect of this will now be described by particular reference to FIGS. 1–3 which show a common cylinder head configuration utilizing conventional valve seat inserts and having five valves per cylinder. This arrangement has been chosen for illustration purposes, because it offers the most severe case where the use of the pressed in inserts can seriously affect the configuration of the flow passages.

Figure 1:
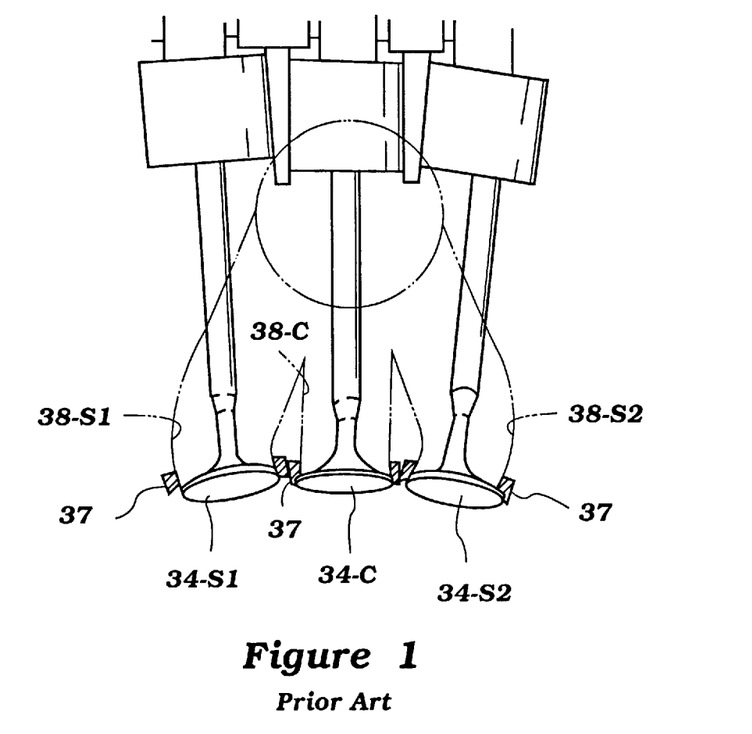
FIG. 1 is a partially schematic side elevational view showing the intake valve and intake passage arrangement for a conventional five valve per cylinder engine embodying a conventional prior art valve seat arrangement.
Figure 2:
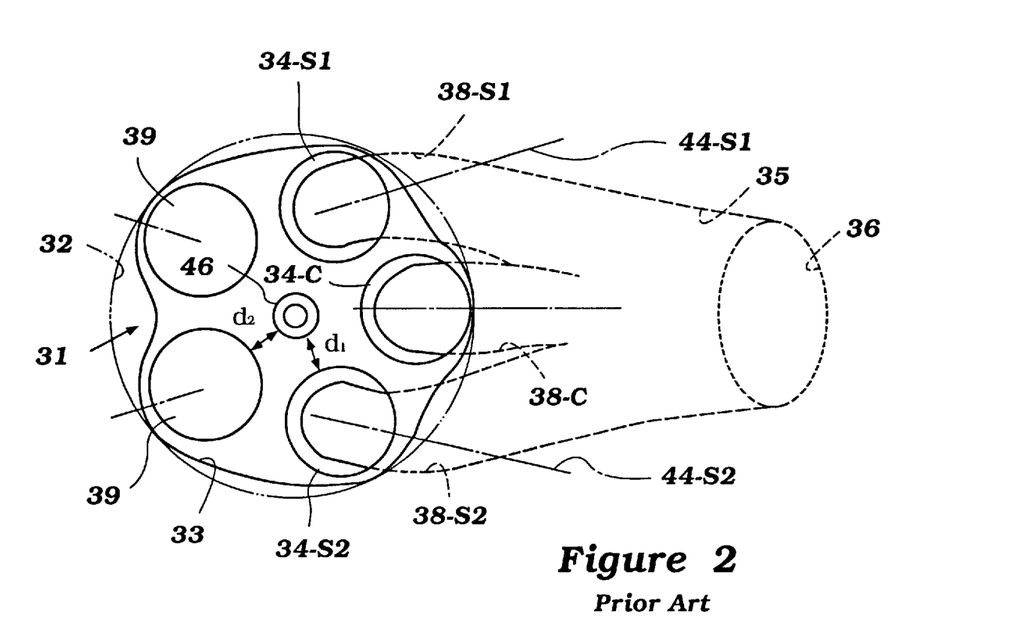
FIG. 2 is a top plan view of the prior are engine construction shown in FIG. 1.
Figure 3:
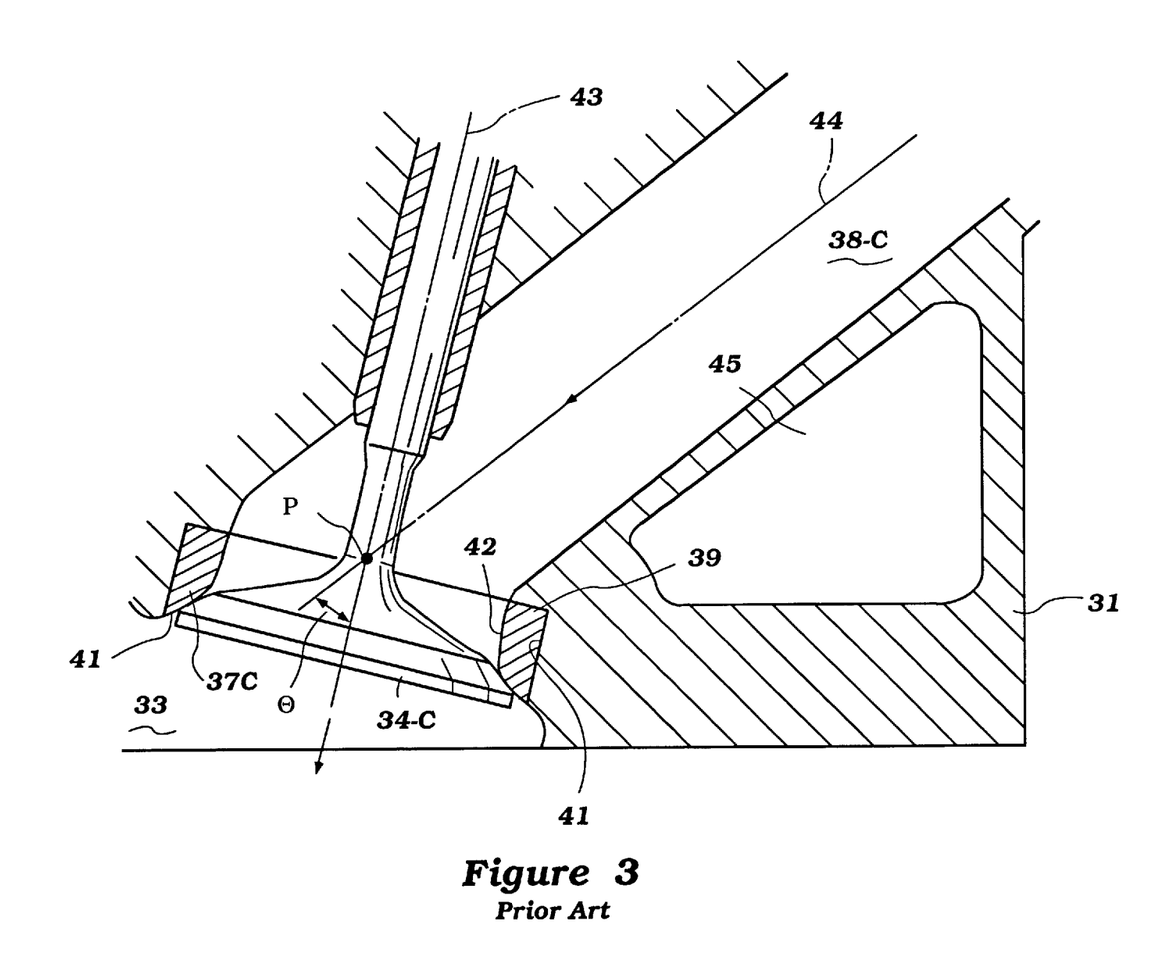
FIG. 3 is an enlarged cross-sectional view taken through the center intake valve seat and passage of conventional prior art construction.

Referring first to FIGS. 1 and 2, these figures are partially schematic views that illustrate generally the cylinder head portion of the combustion chamber of one cylinder of a multi-cylinder internal combustion engine constructed in a generally conventional fashion. The cylinder head is shown primarily in phantom and is identified generally by the reference numeral 31. The cylinder head 31 has a surface that is adapted to be held in sealing engagement with an associated cylinder block that is not shown to provide an end closure for one or more cylinder bores formed therein. One of these cylinder bores is shown in FIG. 2 and is identified by the phantom line circle 32.

The portion of the cylinder head 31 that is confronting relationship with the cylinder bores 32 is formed within a recessed area 33 which forms in part a combustion chamber along with the cylinder bore 32 and the piston received therein. It will be seen that the cylinder head sealing surface extends beyond the recess 33 and this functions to form a squish area, as is well known in this art.

In the illustrated prior art construction, the engine is of a five-valve per cylinder type. This includes three intake valves 34 which are of the poppet type and are supported for reciprocation in the cylinder head in a known manner. These intake valves 34 are arranged so as to comprise a center intake valve 34-C which is disposed further from a plane containing the axis of the cylinder bore 32 and extending parallel to or coincident with the axis of rotation of the associated crankshaft. The center intake valve 34-C is surrounded by a pair of side intake valves 34-S1 and 34-S2. These side intake valves 34-S1 and 34-S2 are disposed closer to the aforenoted plane and, in fact, overly it to some extent.

A Siamese-type intake passage comprised of a main portion 35 which extends from an inlet opening 36 and an outer surface of the cylinder head serves the valve seats 37 associated with the respective intake valves 34. This intake passage branches into three portions comprised of a center portion 38-C and side portions 38-S1 and 38-S2. Any form of desired intake manifold (not shown) serves the intake passage main portion opening 36.

Although it does not appear in the figures, the center intake valve 34-C1 reciprocates about an axis of reciprocation that is disposed at an acute angle to the aforenoted plane. In a like manner, the side intake valves 34-S1 and 34-S2 reciprocate about reciprocal axes that lie in a common plane that is also at an acute angle to the aforenoted plane. This acute angle preferably may be greater than the acute angle of the center intake valve 34-C. In addition and as shown in FIG. 1, the axes of reciprocation of the side intake valves 34-S1 and 34-S2 are also disposed in skewed relationship to the axis of reciprocation of the center intake valve 34-C.

A pair of exhaust valves 39 are supported for reciprocation in the cylinder head 31 in a known manner. These exhaust valves 39 are disposed on the opposite side of the aforenoted plane and cooperate with any suitable exhaust passage system formed in the cylinder head. Like the intake valves, the exhaust valves 39 cooperate with valve seats which are not shown in the figures, but which have a configuration generally the same as that associated with the intake valves. The intake and exhaust valves 34 and 39 are opened and closed in any known manner.

This valve seat arrangement will now be described in more detail in reference to FIG. 3. As may be seen in this figure, the valve seat 37 is formed by an insert piece or ring 39 which has an initial generally cylindrical configuration and is press fit into a recess 41 formed at the outlet end of the intake passage portion 38-C. A seating surface 41 is formed on this insert ring 39 after it is pressed in place.

As may be seen, because of the length of the insert ring 39, there is provided a generally straight section 41 that extends parallel to the reciprocal axis 43 of the valve 34-C. As a result, the center of the flow axis of the intake passage 38-C, indicated by the line 44, intersects the reciprocal axis 43 at a point P which is spaced inwardly from the valve seating surface 41. This intersection is also offset from the center of the valve seat 37-C.

As a result, the flow axis 44 intersects the valve axis 43 at a relatively steep angle θ which means that the flow into the cylinder must turn rather abruptly. In addition, this provides a masking or shrouding action that significantly affects the flow into the combustion chamber and restricts it.

Referring now to FIG. 2, it will be seen that the flow axes 44-S1 and 44-S2 associated with the side intake valves also are disposed at an angle. In addition, these axes are skewed as seen in FIG. 2 which means that the actual intake passages portions 38-S1 and 38-S2 curve. Thus, a conflicting flow pattern exits in the combustion chamber.

The flow from the side intake valve seats 37-S1 and 37-S2 will tend to pass across the combustion chamber axis and generate a tumble action. However, the flow from the center intake valve seat 37-C will flow generally axially downwardly and may, in fact, create some reverse tumble action that will negate the tumble action from the side intake valve seats 37-S1 and 37-S2. This is not desirable, particularly at low speeds and low loads.

Thus, the use of the large insert ring significantly compromises the shape of the intake passages and the flow path in them. In addition, it can add restrictions to the flow when the passages portions must be reconfigured so as to accommodate the straight portions and provide relatively smooth transition.

It should also be noted that the construction is such that a water jackets 45 of the cylinder head must be spaced a fairly substantial distance away from the valve seat insert rings 37. As-a result, the cooling is deteriorated. Furthermore, the manner of insertion of the valve seat insert rings gives rise to thermo barriers that further aggravate the heat problem and cause the valves to operate at a higher temperature than is desirable.

Furthermore and as seen in FIG. 1, the spark plug for the engine, indicated generally by the reference numeral 46, is disposed generally centrally in the combustion chamber. However, because of the stress situations resulting from the pressed in insert construction, it is necessary to provide a relatively large spacing d1 from the side intake valves 34-S1 and 34-S2 to the spark plug 46. In addition, an even larger spacing d2 is required between the exhaust valves 39 and the spark plug 46. This further aggravates the problem in providing large valve areas since clearances must be maintained so as to avoid cracking in the cylinder head either during the pressing operation or when the engine reaches high temperature after the engine is operation. The residual stresses can then cause this cracking to occur if large clearances are not maintained.

It is, therefore, a principal object of this invention to provide and improved cylinder head in construction that permits an improved flow into the combustion chambers and wherein the flow will not be dictated by the valve seat insert.

It is a further object of this invention to provide an improved intake passage and valve seat arrangement for the cylinder head for an internal combustion engine.

SUMMARY OF THE INVENTION

This invention is adapted to be embodied in a cylinder head for an internal combustion engine that is comprised of a main cylinder head body that is formed from a first material. The main cylinder head body is formed with a surface that is adapted to be in facing relationship to a cylinder block for closing a cylinder bore therein. A recess is formed in the main cylinder head body which is surrounded by the surface. A flow passage extends through the cylinder head body between a valve seat formed in the recess and an external surface of the main cylinder head body. The flow passage has a center flow axis that extends therethrough and which passes generally through the center of the valve seat.

BRIEF DESCRIPTION OF THE DRAWINGS

FIGS. 8–13 are enlarged cross-sectional views showing the manner by which the valve seats a reformed in accordance with the invention.

DETAILED DESCRIPTION OF THE PREFERRED EMBODIMENT

Figure 4:
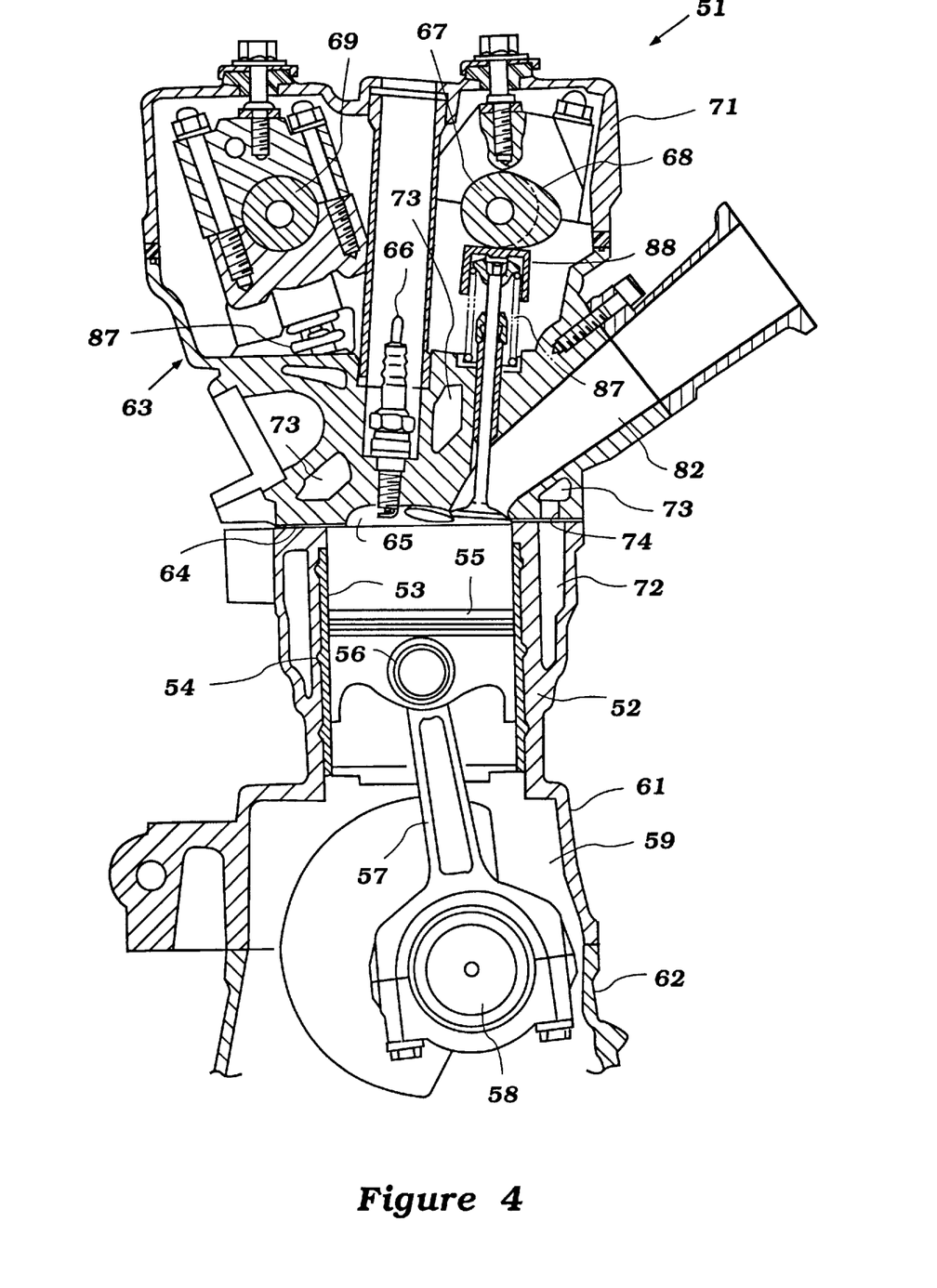
FIG. 4 is a cross-sectional view taken through a single cylinder of a multiple-cylinder internal combustion engine constructed in accordance with an embodiment of the invention.

Referring first to FIG. 4, an actual internal combustion engine constructed in accordance with an embodiment of the invention is shown in a single cross-sectional view taken through one cylinder of the engine which engine is indicated generally by the reference numeral 51. The engine 51 includes a cylinder block 52 which may be formed from any suitable material, such as aluminum or aluminum alloy casting of light weight.

Cylinder bores 53 are formed by pressed or cast in liners 54 held in the cylinder block 52 in a known manner. Pistons 55 reciprocate in the cylinder bores 53. The pistons 55 are connected by means of piston pins 56 to the small ends of connecting rods 57. The big connecting rod ends are journaled on a crankshaft 58 in a known manner. The crankshaft 58 rotates in a crankcase chamber 59 formed by a skirt 61 of the cylinder block 52 and an interconnected crankcase member 62.

A cylinder head assembly, indicated generally by the reference numeral 63 is affixed to the cylinder block 52 in a known manner. The cylinder head assembly 63 has a lower surface 64 that is held in sealing engagement with the cylinder block 52. Recesses 65 are formed in this lower cylinder head surface 64 and cooperate with the cylinder bores 53 and pistons 55 to form the combustion chambers of the engine. As may be seen in FIG. 5, the cylinder head surface 64 has portions in confronting relationship with the cylinder bore 53 so as to perform a squish action.

Figure 5:
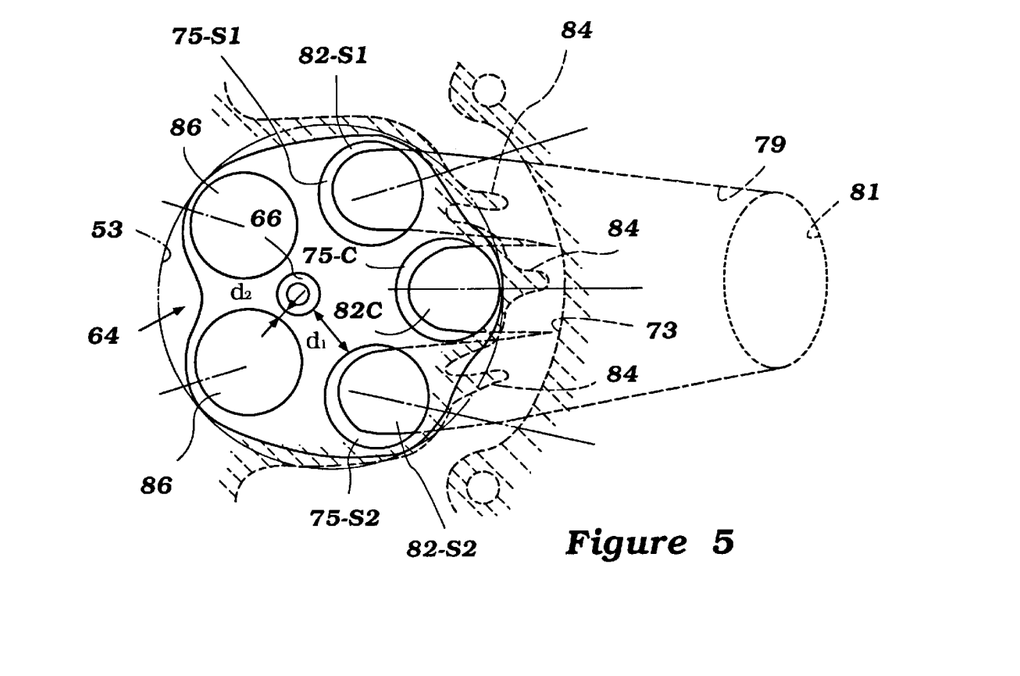
FIG. 5 is a cross-sectional view, in part similar to FIG. 2, showing the construction of this invention.
Figure 6:
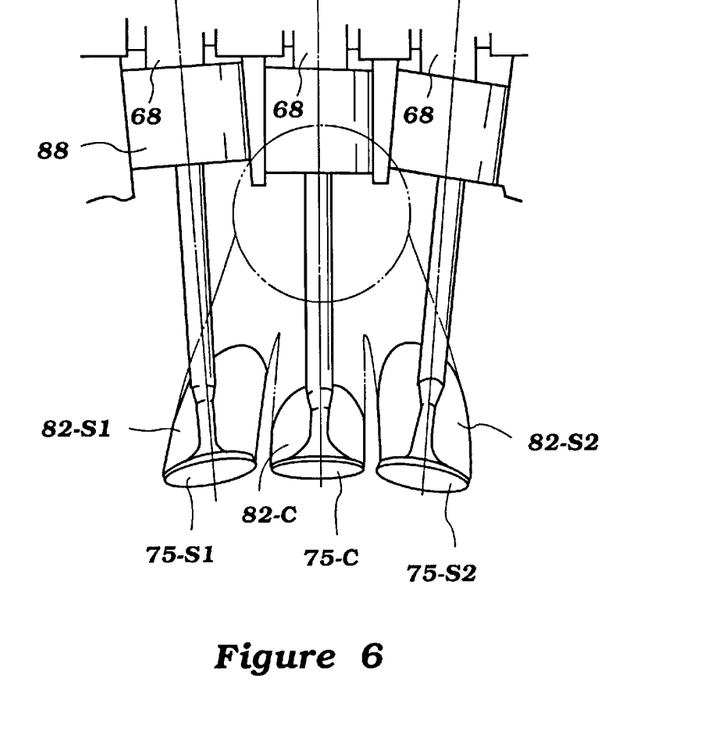
FIG. 6 is a partially schematic view, in part similar to FIG. 1, showing the construction in accordance with the invention.
Figure 7:
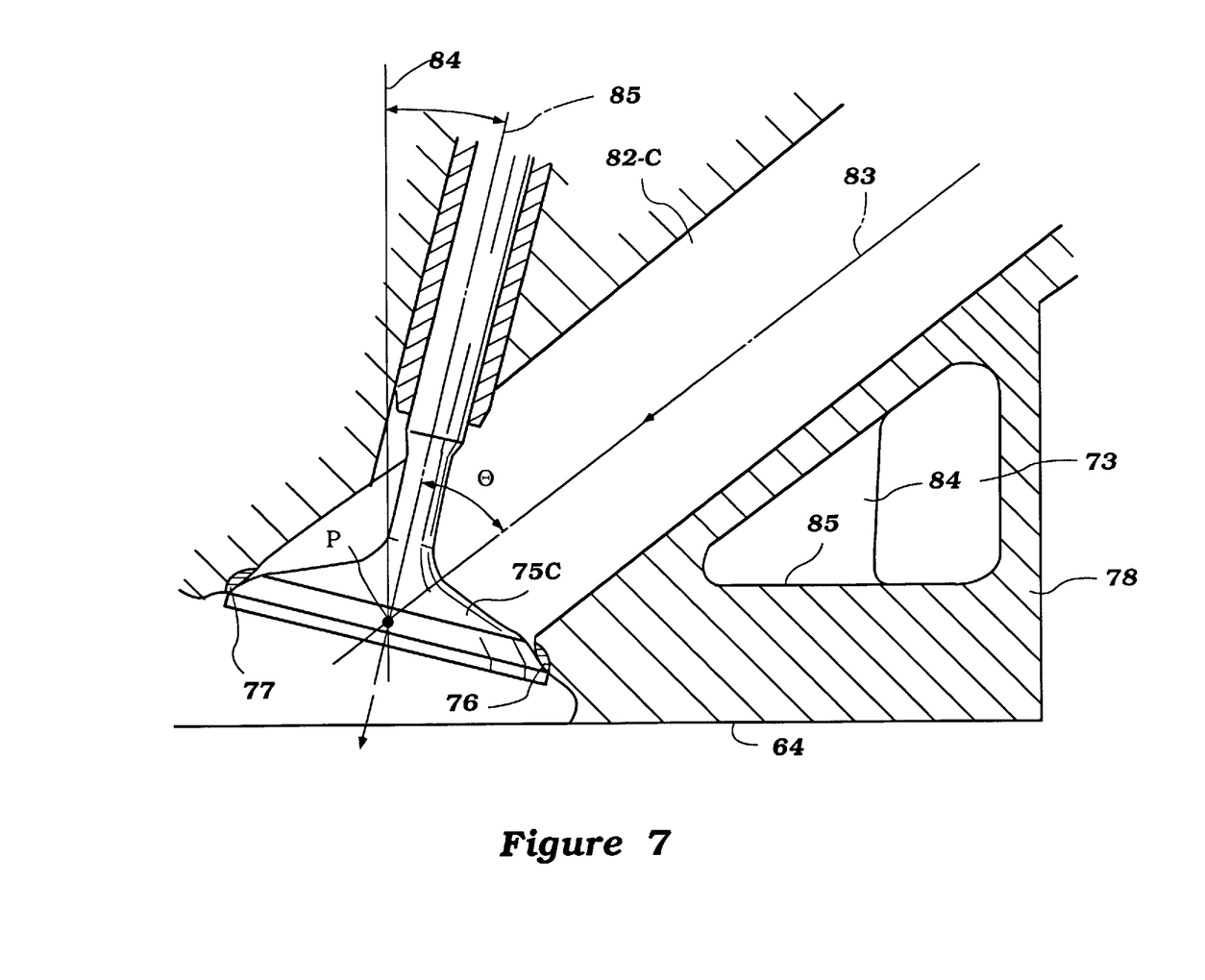
FIG. 7 is an enlarged cross-sectional view taken through the center valve seat and intake passage of this embodiment and compares with the prior art construction shown in FIG. 3.

The valve and valve passage arrangement for the engine will be described later by more reference to FIG. 5–7. However, it should be noted that a spark plug 66 is mounted in the cylinder head so that its spark gap is disposed in registry with the recess 65. The spark gap 66 may either be centrally positioned or more preferably is offset in the combustion chamber with the offset relationship being depicted in FIGS. 4 and 5.

An intake camshaft 67 is rotatably journaled in the cylinder head assembly 63 in a conventional manner. The intake camshaft 67 has cam lobes 68 that operate the intake valves of the engine in a manner which will be described. In a similar manner, an exhaust camshaft 69 is also rotatably journaled in the cylinder head assembly 63. The exhaust camshaft 69 has cam lobes (not shown) that operate the exhaust valves of the engine as will also be described. The camshafts 67 and 69 are driven at one-half crankshaft speed by a suitable timing drive mechanism (not shown). The valve train is closed by a cam cover 71 which forms a portion of the cylinder head assembly 63 and which is affixed to the remainder of the cylinder head assembly in a known manner.

The engine 51 is also water cooled. To this end, the cylinder block 52 is formed with a cooling jacket 72. This cooling jacket communicates with a cylinder head cooling jacket 73 through one or more passages 74 formed in the cylinder head which communicates the cooling jacket 72 and 73 with each other in a manner also well known in this art.

The valve and intake passage arrangement for the engine will now be described by more detail to FIGS. 5–7. As with the prior art type of construction, a three intake valve per cylinder arrangement is employed that consists of a center intake valve 75-C and pair of side intake valves 75-S1 and 75-S2. These intake valves 75 cooperate with respective valve seats which are shown best in FIG. 7 and which are identified by the reference numeral 76.

The way in which the valve seats are formed will be described later, but they consist primarily of an insert ring 77 that is metallurgically bonded in place into the base metal of the cylinder head assembly 63 and specifically a main cylinder head casting 78 thereof. As will be described, the cylinder head casting 78 is formed from an aluminum or aluminum alloy. The insert rings 77 are formed by a Sintered iron that has a coating and impregnation material which may consist primarily of copper, as will also be described.

Because of the unique way in which the insert rings 77 are metallurgically bonded in place, they may be substantially smaller than the prior art type of construction. As a result of this, it is possible to obtain a much more favorably configured passage arrangement, as will also be described.

A Siamese-type intake passage, indicated generally by the reference numeral 79 is formed in the intake of the cylinder head and this includes an inlet opening 81 that is formed in the outer side of the cylinder head member 78. A suitable induction system which may include a charge former is affixed thereto.

The intake passage 73 is branched into three branch sections, each indicated by the reference numeral 82, which comprise a center branch section 82-C and pair of side branch sections 82-S1 and 82-S2. As may be seen best in FIG. 7, each intake passage branch section has a flow axis 83 which can extend substantially straight through the center of the valve seat 76 which center is indicated by the axis 84 and, thus, intersects this center at a point P. An angle θ exits between the reciprocal axis 85 of the valves 75 and the flow axis 83 which angle is substantially greater than with the prior art type of construction.

As a result, the intersection point P lies axially on the valve seating surface 76 or on a plane containing the axis of the valve seat in area 76 and, hence, permits a generally straight flow of air charge into the combustion chamber. As may seen in FIG. 5, the side intake passage portions 82-S1 and 82-S2 can also extend generally straight and need not be curved. Because of this, the flow into the combustion chamber through the valve seats 76 is not obstructed and can pass in such a direction so that all valve seats on the intake side generate a tumble motion to the intake charge in the same direction.

This configuration permits the cylinder head water jacket 73 to extend through the area close to the valve seat insert 77 and permits the formation of reinforcing ribs 84 that lie below each of the intake passage portions 82-C and 82-S1 and 82-S2. This provides not only reinforcing but greater heat transfer. In addition, the lower surface 85 of the cooling jacket 73 is disposed closer to the cylinder head surface 64.

Exhaust valves 86 are disposed in the cylinder head member 78 on the side opposite the intake valves. Because of the fact that smaller insert rings can be employed, the spark plug 66 can be positioned quite close to the exhaust valves at the distance d2 which is substantially greater than the distance d1 between the spark plug and the intake valves. This provides a more optimum spark plug position.

As best seen in FIG. 4, each of the valves 75 and 86 has associated with it a respective, return spring assembly 87 that urges the valves to their closed position. The valves are open by means of the cam lobes associated with the cam shafts 67 and 69 via thimble tappets 88.

The manner in which the valve seats 76 are formed will now be described by reference to FIGS. 8–15. However, it is to be understood that this method of attachment provides a metallurgical bonding of the insert ring 77 to the cylinder head body 78 and not an alloying therebetween. This avoids the disadvantages of the prior art type of construction and basically is accomplished by pressing the insert ring 77 into place and passing an electrical current through it that is sufficient to cause the cylinder head material of the body 78 to plastically deform upon insertion of the insert ring 77. The plastically deformed phase of the cylinder head material forms a metallurgical bond at the interface with the insert ring without any significant alloying of the cylinder head material to that of the insert ring.

This methodology is described in more detail in the copending application entitled "Valve Seat Bonded Cylinder Head and Method for Producing Same," filed in the names of Shuhei Adachi and Junichi Inami, Ser. No. 08/483,246, filed Jun. 7, 1995. In addition, certain of these techniques are also described in the copending application entitled "Valve Seat" filed in the names of the same inventors, Ser. No. 08/278,026, filed Jun. 20, 1994. Furthermore, the insert ring material may be heat treated as described in the copending application also filed in the names of the same inventors entitled "Valve Seat," Ser. No. 08/614,503, filed Mar. 13, 1996 all of which applications are assigned to the assignee hereof.

Basically, the valve seat 76 is formed by the insert ring, indicated by the reference numeral 77 and which has a metallurgical construction as will be described. This insert ring 77 is bonded to the cylinder head material 78 by a relatively thin metallurgical bonding layer that is formed in a manner which will be described. By relatively thin, it should be noted that this bonding layer is no thicker than about ten micrometers (10 mu). Adjacent this bonding layer, there is formed a portion of the material of the cylinder head 78 which has been plastically deformed. This layer has a thickness which preferably is no greater than 200 mu. It should be noted that the alloy of the cylinder head 78 is of the same chemical composition and same physical structure, except for being slightly work hardened in the area as in the remainder of the cylinder head material 78.

The insert ring 77 in accordance with this embodiment is formed with a cylindrical inner surface 91 that is relatively short in axial length and which merges into a tapered conical surface 92. The surface 92, forms a pressing surface, as will be described, and ends in an end surface 93. A first, conical outer surface section 94 extends at an acute angle to the axis of the cylindrical section 91 and merges at a rounded section 95 into an inclined lower end surface 96 which is formed at acute angle to a plane perpendicular to the axis of the cylindrical section 91.

Figure 8:
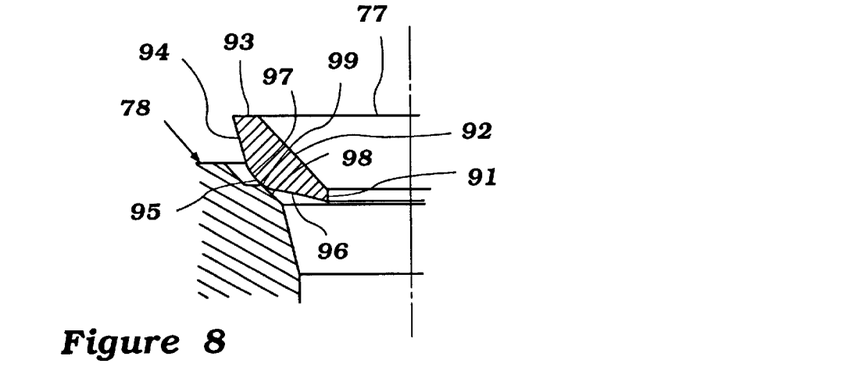
FIG. 8 shows the initial insertion of the insert ring into position for pressing.
Figure 9:
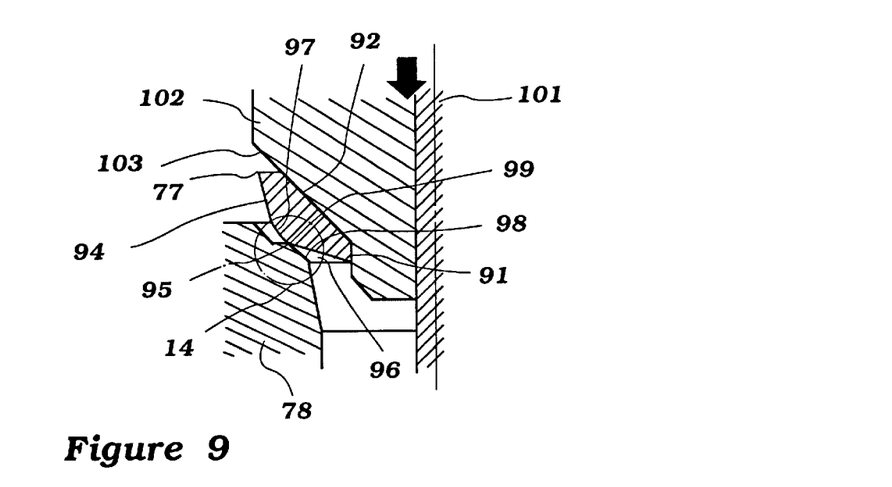
FIG. 9 shows the initial application of pressing pressure.
Figure 10:
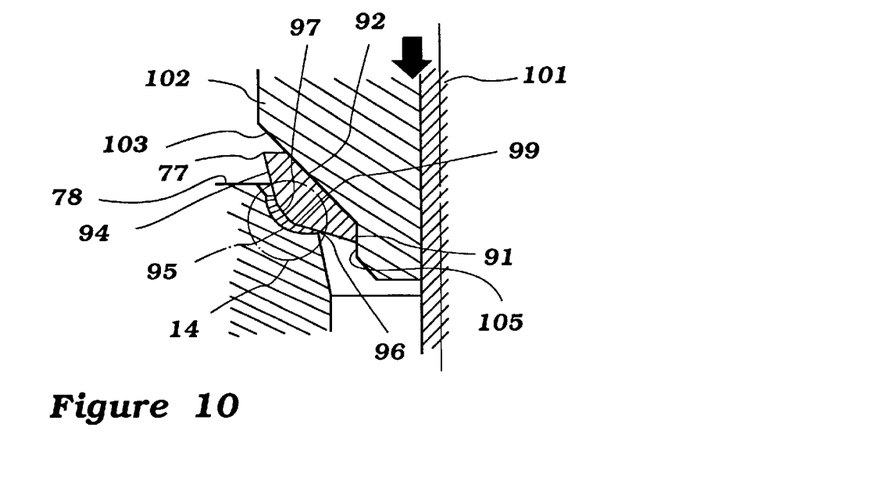
FIG. 10 shows the arrangement wherein the metallurgical bond is initially formed.
Figure 11:
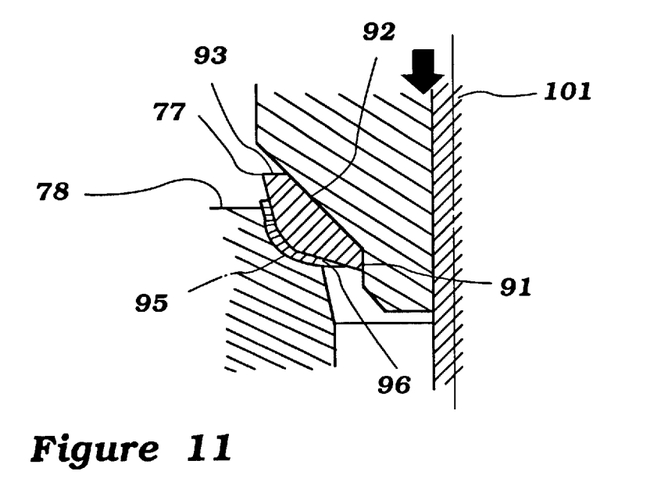
FIG. 11 shows the final portion of the pressing step wherein the metallurgical bond has been completed.

The cylinder head material 78 is formed with a recess that is comprised of a first section 97 that is connected to a second section 98 that are joined by a horizontal surface that forms a projecting ledge 99 that contacts the rounded portion 95 of the insert ring 77 upon initial installation (FIGS. 8 and 9). This tends to form a localized area that will begin a plastic deformation phase.

The pressing apparatus includes a guide post 101 that extends into the cylinder head passage opening 38-C and which supports a pressing member 102. The pressing member 102 has an inclined pressing surface 103 that is complementary in configuration to the insert conical portion 104. A pilot portion 105 of the pressing member is generally complementary to the insert ring opening 91, but actually forms no pressing function.

The insert ring 77 is formed preferably from a Sintered powdered ferrous iron material.

A pressing force is then applied, and a current is passed so as to cause the plastic deformation layer to be formed. In accordance with a preferred pressing pattern, a pressure is gradually applied through the pressing mandrel or tool 102 along its surface 92. This pressure is gradually built up to the pressure and is held constant for a time until the electrical current begins to flow. The electrical current is built up over a time period to a first relatively high current flow. After this occurs, there will be sufficient liquification and plastic deformation of the material, and the pressing force is then built up to a higher pressing pressure.

At some time, the current is decreased so as to avoid excess heating and any melting or plastic deformation of the insert ring 77. Then the current flow is again raised to a lower level from the previous level and held at this lower level for an additional time period while the pressing force is maintained. Then the current flow is discontinued while the pressing continues up to the stage of FIG. 11. At this time the bond is finally and completely formed.

As has been previously noted, the insert ring 77 is also impregnated with and coded with a layer of a material such as copper. The copper assists in the bonding process as may be best seen in FIGS. 14 and 15 and also adds in removing surface impurities which might otherwise be present on the aluminum of the cylinder head casting 78.

Figure 12:
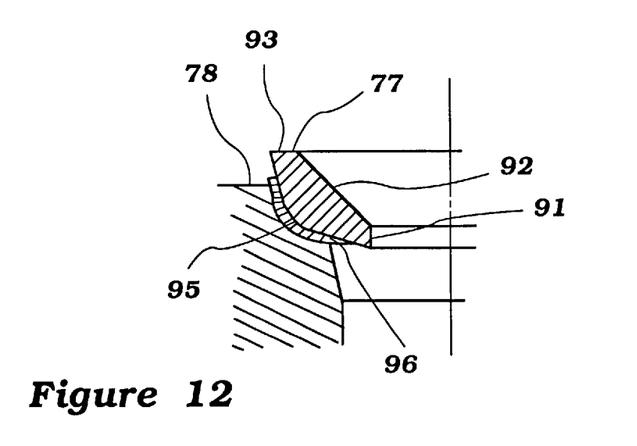
FIG. 12 is a view showing the bonded insert in position and before machining.
Figure 14:
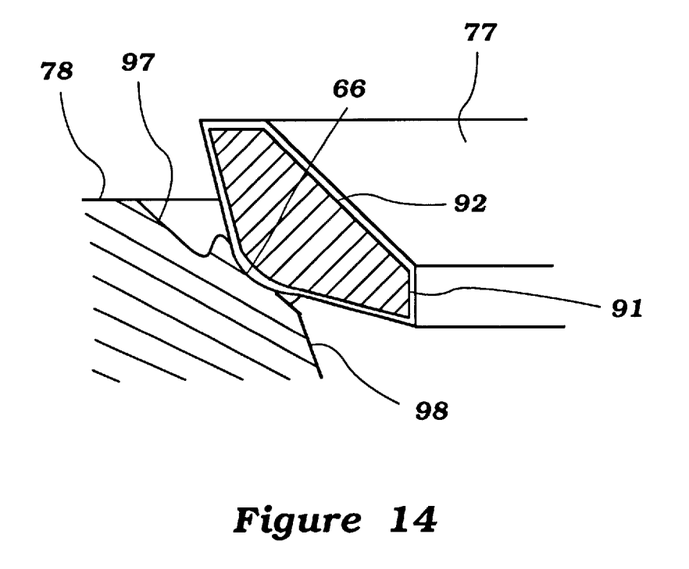
FIG. 14 is an enlarged view showing the condition mid-way between the conditions shown in FIGS. 9 and 10 of the area encircled by the circle 14 in these two figures.
Figure 15:
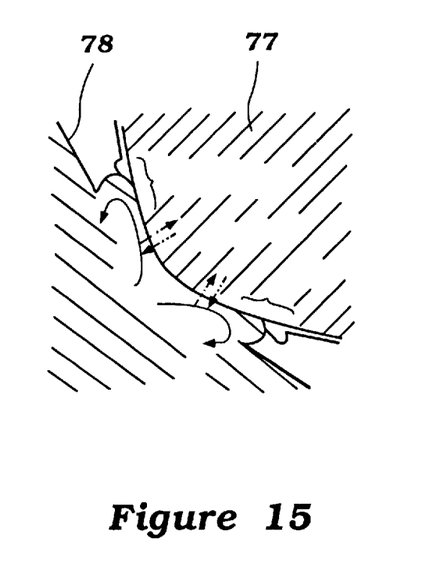
FIG. 15 is a further enlarged cross-sectional view showing the manner in which the bond is formed and corresponds to FIG. 14.

This copper layer is shown at 103 in FIGS. 14 and 15. Aluminum or the aluminum alloy of the cylinder head as a melting temperature of about 1,083° C. while the cooper as melting point of about 660° C. However, during the plastic deformation phase, a eutectic alloy is formed that has a lower melting temperature, that of about 548° C. As a result, it is possible to achieve the bonding with a lower temperature and thus further insure against any alloying between the basic material of the insert ring and that of the cylinder head. Further, the cooper will react with aluminum oxides and form a removal section that is forced to the exterior of the joint when pressing is completed as seen in FIG. 12.

Figure 13:
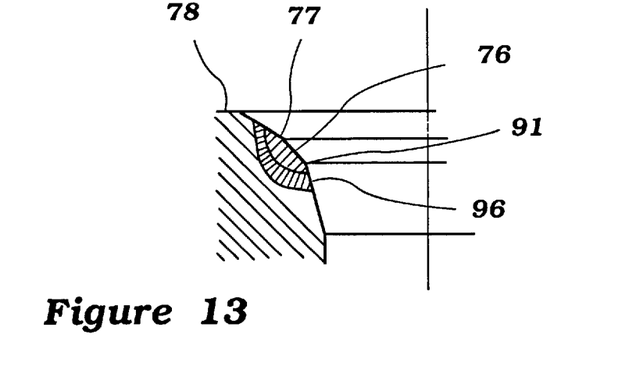
FIG. 13 shows the final valve seat.

Thus, when the machining for the finish seating surface is done at the step 13, all of these impurities will be removed. Thus, the final bonded joint is much stronger and much more consistent than with the prior art type of constructions.

Thus, from the foregoing description if should be readily apparent that the described cylinder head provides an extremely effective intake flow path that need not be dictated from the shape of the insert ring because of the unique methodology and apparatus by which the insert ring has bonded into place. Although these advantages are particularly significant in connection with the intake valve, they also may be employed on the exhaust side of the engine. This greatly facilitates the formation of cylinder heads having multiple valves. Of course, the foregoing description is that of preferred embodiments of the invention and various changes and modifications may be made without departing from the spirit and scope of the invention, as defined by the appended claims.

What is claimed is:

1. A cylinder head for an internal combustion engine comprised of a main cylinder head body formed from a first material, said main cylinder head body being formed with a surface adapted to be facing relationship to a cylinder block for closing a cylinder bore formed therein, a recess in said main cylinder head body surrounded by said surface, a generally straight flow passage extending through said cylinder head body from a valve seat formed in said recess and an external surface of said main cylinder head body, said flow passage having a generally straight center flow axis extending through its length and passing generally through the center of said valve seat, said valve seat being formed by an insert ring that is formed from a material that is dissimilar to the material of said cylinder head and which is metallurgically bonded to said cylinder head material by applying heat and pressure, during insertion of the insert ring to establish said bond through plastic deformation of at least one of said insert ring and said cylinder head without substantial allowing of said insert ring and said cylinder head materials.

2. The cylinder head as set forth in claim 1, wherein the flow axis passes through the center of the intake valve seat in a plane lying generally in the seating area with an associated poppet valve.

3. The cylinder head as set forth in claim 2, wherein the flow axis is disposed at a substantial acute angle to the reciprocal axis of an associated poppet valve.

4. The cylinder head as set forth in claim 3, wherein the flow axis intersects a poppet valve that controls the flow through the valve seat at substantially the center of the head of the valve.

5. The cylinder head as set forth in claim 1, wherein the flow axis is disposed at a substantial acute angle to the reciprocal axis of an associated poppet valve.

6. The cylinder head as set forth in claim 5, wherein the flow axis intersects a poppet valve that controls the flow through the valve seat at substantially the center of the head of the valve.

7. The cylinder head as set forth in claim 1, wherein the flow axis intersects a poppet valve that controls the flow through the valve seat at substantially the center of the head of the valve.

8. The cylinder head as set forth in claim 1, wherein there are three intake valve seats formed in the cylinder head recess comprised of a center intake valve seat and a pair of side intake valve seats all disposed on substantially one side of a plane containing the axis of the associated cylinder bore and a pair of exhaust valves disposed on the other side of the plane, the flow passage comprising at least the flow passage serving the center intake valve.

9. The cylinder head as set forth in claim 8, wherein the flow passages serving each of the intake valve seats is configured to pass through the center of the respective valve seat.

10. The cylinder head as set forth in claim 8, wherein there is provided a water jacket extending below the intake passage.

11. The cylinder head as set forth in claim 10, wherein there is formed a rib in the cylinder head main body material extending into the water jacket for promoting heat transfer therebetween.

\* \* \* \* \*